Patented Mar. 11, 1947

2,417,264

UNITED STATES PATENT OFFICE 2,417,264

LUBRICANT

Arnold J. Morway, Clark Township, Union County, and John C. Zimmer, Union, N. J., assignors to Standard Oil Development Company, a corporation of Delaware No Drawing. Application January 1, 1944, Serial No. 516,703

6 Claims. (Cl. 252—36)

The present invention is concerned with the production of improved lubricating grease compositions. The invention more particularly relates to a grease composition which is especially adapted for use under extreme variations in climatic conditions, such as wide variations in temperature and humidity. The preferred composition comprises a mineral oil base thickened to a grease consistency with a mixture of saturated fatty acid soaps of lithium and zinc or tin.

This application is a continuation-in-part of application Serial No. 424,926, filed December 30, 1941, now U. S. Patent 2,363,013, issued November 21, 1944.

It is known in the art to prepare various lubricating grease compositions adapted for particular uses. The uses in which grease compositions are employed present a wide variety of conditions and generally a grease prepared with a given set of conditions in mind is not suitable for use under a different set of conditions. Airplanes are controlled in flight by special mechanisms such as rudders, elevators, and ailerons which are attached to the main portions of the airplane such as fuselage and wings by specially designed bearings. These bearings have metal to metal contact surfaces which offer a very difficult lubrication problem. Airplanes are operated under the most severe changes in climatic condition and since the failure of even one part of the mechanism might well result in a catastrophe, it is imperative that all parts of the plane be maintained in as perfect a mechanical condition as possible. In order to be in good mechanical condition, all movable parts should be free and well lubricated at all times. It is not uncommon for a plane during a single trip to be subjected to extremely high ground temperatures, subzero temperatures in the upper atmosphere as well as conditions of high humidity such as rain, snow, or ice. Any lubricant used upon the control mechanisms of the plane must be capable of withstanding these conditions without disintegration.

High temperature greases such as the sodium soap greases are known to the art, however they are quite water-soluble and readily disintegrate under humid conditions. Water-insoluble greases, such as the calcium soap greases, are also known, but these compositions will not withstand high temperatures. Aluminum soap greases are also water insoluble but have a relatively low transient point where they become fluid or rubbery and run or pull out of the bearing. Mixed aluminum soap greases are also available and perform very satisfactorily under these adverse conditions, however, they offer troublesome manufacturing difficulties. Aluminum soaps gel at relatively high temperatures, which makes a continuous process for producing mixed aluminum soap greases an impracticability.

It is an object of this invention to produce a grease composition which will provide adequate lubricating at both high and low temperatures and will not decompose in the presence of excessive moisture. Another object is to provide a grease having not only adequate lubricating properties but one which can be made readily by a continuous process. These and other objects will be apparent to those skilled in the art upon reading the following description.

The grease composition made in accordance with the present invention comprises essentially a low pour point lubricating mineral oil distillate, a lithium soap of a saturated fatty acid and a zinc or tin soap, it being preferred to use from 10 to 20% of the lithium soap and from 1.0 to 2.0% of the zinc or tin soap based upon the total composition. A small amount of an anti-oxidant, say from .1–1%, such as phenyl alpha naphthylamine, may be used if desired.

Although any of the numerous types of low pour point lubricating oils may be used as the base for compositions made in accordance with this invention, it is preferred to use a Coastal type oil having a viscosity, in the range of from about 37 seconds to 100 seconds S. U. V. at 100° F. and a cold test below −40° F.

For the formation of the soaps utilized in the production of the greases, any saturated fats or saturated fatty acids derived therefrom, such as stearin or stearic acid may be used, although it is preferred to use the saturated acids derived from hydrogenated fish oil. In forming the zinc and tin soaps, oleic acid and naphthenic acids may also be used.

Any of the methods customarily employed in the compounding of greases may be used in the production of the compositions of this invention, although these compositions are particularly adapted to production by continuous methods. The soaps may be produced separately and then mixed with the oil by heat and agitation; or preferably the saturated fat or fatty acid to be combined with the lithium may be dissolved in a portion of the lubricating oil by heating the oil sufficiently to dissolve the fat or acid in the oil, reacting the fat or fatty acid with lithium hydroxide and then the remainder of the lubricating oil having the zinc or tin soap dispersed therein may be added after which the mixture is brought to a clear solution and the water driven off by heating and stirring, the anti-oxidant added and the mixture permitted to cool. It is preferred to make the zinc or tin soap, whichever is employed, separately and then dissolve it in a portion of the lubricating oil although either of these soaps can be produced from the saturated fatty acid and the hydrated oxide in situ in the oil. Greases of varying consistency to meet the demands of particular conditions may be secured by varying the soap content of the grease within the limits specified. The following examples will serve to illustrate specific embodiments of the invention.

EXAMPLE 1

|  | Per cent |
|---|---|
| Hydrogenated fish oil acids | 13.00 |
| Lithium hydroxide (monohydrate) | 2.00 |
| Zinc naphthenate | 1.00 |
| Lubricating oil (low pour Coastal oil) | 83.80 |
| Phenyl alpha naphthylamine | 0.20 |

In compounding the above formula the acid and approximately one-fourth of the oil are charged into a fire-heated kettle equipped with agitators. The mixture is then heated and stirred to a temperature of about 150° F. or until all the acid is melted and dissolved in the oil and then the lithium hydroxide dissolved in boiling water is added to the acid-oil solution. Heating and agitation is continued and the temperature permitted to slowly rise until all of the water is boiled off. During this continued heating small additional amounts of the oil are intermittently added. After about three-fourths of the oil has been added, a sample is taken for free alkalinity determination and adjustment. The grease at this point should be neutral or slightly alkaline (not more than .1% calculated as NaOH). The zinc soap dispersed as a slurry in the balance of the lubricating oil is then added to the kettle after the water has been boiled off. The temperature of the kettle is then raised to within the range of from 350 to 400° F. or preferably about 370° F., at which temperature the grease is completely melted. The phenyl alpha naphthylamine is then added after which agitation and heating is discontinued and the grease permitted to cool forming a smooth almost transparent block. The grease is then worked to a smooth paste in the kettle, filtered and packaged. The grease thus produced has the following characteristics:

| A. S. T. M. worked penetration at 77° F | 285 |
|---|---|
| Melting point °F | 374 |
| Free acidity per cent | [1] 0.21 |

[1] Calculated as oleic acid.

Soaking a sample of the grease in water shows no effect on the grease over a period of four weeks. A thin layer of the grease spread out over a steel sheet and subjected to a jet of hot water (175° F.) under force is not washed off, after some 5 hours. No oil separates from the grease after standing for 100 hours at 160° F.

*Low temperature test at −40° F.*

Test and apparatus described in paper presented before the 44th annual meeting of the American Society for Testing Materials held in Chicago, Illinois, 6/23–27/41.

*Performance Specifications for Greases, Robert C. Adams and Harrison E. Patten*

| Force to turn 3 bearings, gms. | Approximate torque, gms.-cm. | Time for 1 revolution, secs. | Plasticity number |
|---|---|---|---|
| 200 | 500 | 2.7 | 1,350 |

EXAMPLE 2

100 parts of hydrogenated fish oil acids are neutralized with 15.73 parts of a lithium hydroxide (monohydrate) dissolved in water. The resulting lithium soap is dried and powdered.

|  | Per cent |
|---|---|
| Lithium soap (described above) | 15.00 |
| Zinc oleate | 1.00 |
| Phenyl alpha naphthylamine | 0.50 |
| Lubricating oil (Low pour, Coastal oil <−40° F. pour point, 58 S. S. U. viscosity at 100° F.) | 83.50 |

The lithium soap and approximately three-fourths of the lubricating oil are added to a fire-heated kettle. These ingredients are worked to a smooth paste and the temperature raised to 300° F. Alkalinity is then determined and adjusted as in Example 1. The zinc soap dispersed in the balance of the oil is then added, the kettle covered and the temperature raised to 400° F. Stirring and heating is discontinued and the material cooled to room temperature. When cool the solid mass is worked to a smooth plastic homogeneous grease and filtered. The physical properties of this product closely resemble those for the grease described in Example 1.

EXAMPLE 3

|  | Per cent |
|---|---|
| Hydrogenated fish oil acids | 13.00 |
| Lithium hydroxide | 2.05 |
| Zinc naphthenate | 1.00 |
| Phenyl alpha naphthylamine | .50 |
| Lubricating oil | 83.45 |

The foregoing ingredients are converted to grease in the following manner. Hydrogenated fish oil acids and an equal portion of the mineral oil are heated together until complete solution occurs (150° F.). This solution of mineral oil and acid is continuously metered hot into a mixing chamber and an aqueous solution of lithium hydroxide or the dry lithium monohydrate is continuously metered into the mixing chamber in stoichiometrical portions. This mixing zone may be of any suitable type, such as a vertical cylindrical mixing chamber equipped with agitators or it may be in various other forms such as a screw conveyor or even a simple baffled pipe in which the various materials become mixed by turbulent flow through the pipe. The mixture is then pumped continuously into a heating zone held at 500° F. of a capacity and hold up sufficient to completely neutralize the acid in one pass. This hot soap concentrate passes into a surge tank where water vapor and other vapors formed during the reaction are vented and removed, after which the hot soap concentrate is blended with mineral oil heated to 400° F. and containing the zinc soap and phenyl alpha naphthylamine in solution in the oil. The blending is completed by passing the hot soap concentrate and hot oil into a Lancaster disperser. The thoroughly mixed and fluid grease is then pumped through a suitable chilling mechanism, preferably one cooling down to 100–125° F. and then through a Cornell or other suitable homogenizer to remove air inclusion etc. following which it is filtered and packaged. The cooling can be done by pouring into pans equipped with water cooled bottoms, or if desired allowed to cool by air radiation. The product can also be cooled in kettles or similar containers equipped with jackets to permit circulation of cooling water. Other methods include pumping through a helical blade screw or worm type heat exchanger such as a Vogt or Carbondale chiller. The product may also be cooled by discharging on the surface of an internal cooled drum or on the inside surface of a jacketed cylinder equipped with agitators to insure rapid heat exchange.

We claim:

1. An improved lubricating grease composition comprising a low pour point lubricating mineral oil distillate, 10–20% of a neutral to basic lithium soap of a soap stock selected from the group consisting of saturated fats and saturated fatty acids containing not more than 0.1% alkali calculated as NaOH and 1–2% of a soap selected from the group consisting of zinc soap and tin soap.

2. A grease composition as defined by claim 1 in which the lithium soap of a saturated fatty acid is the lithium soap of hydrogenated fish oil acids.

3. A grease composition as defined by claim 1 in which the soaps of zinc and tin are soaps of hydrogenated fish oil acids.

4. A grease composition as defined by claim 1 in which the soaps of zinc and tin are oleates.

5. A grease composition as defined by claim 1 in which the soaps of zinc and tin are naphthenates.

6. A grease composition as defined by claim 1 containing also an oxidation-inhibiting amount of phenyl alpha naphthylamine.

ARNOLD J. MORWAY.
JOHN C. ZIMMER.

REFERENCES CITED

The following references are of record in the file of this patent:

UNITED STATES PATENTS

| Number | Name | Date |
| --- | --- | --- |
| 1,837,279 | McGill | Dec. 22, 1931 |
| 2,202,826 | Brandes | June 4, 1940 |
| 2,245,772 | Gothard et al. | June 17, 1941 |
| 2,274,673 | Earle I | Mar. 3, 1942 |
| 2,293,052 | Earle II | Aug. 18, 1942 |
| 2,351,384 | Woods et al. | June 13, 1944 |
| 2,363,013 | Morway et al. | Nov. 21, 1944 |